United States Patent
Ojiro et al.

(10) Patent No.: US 12,111,168 B2
(45) Date of Patent: Oct. 8, 2024

(54) SYSTEM FOR GENERATING GUIDANCE INFORMATION

(71) Applicant: LOGISTEED, Ltd., Tokyo (JP)

(72) Inventors: Daichi Ojiro, Tokyo (JP); Shunsuke Minusa, Tokyo (JP); Takeshi Tanaka, Tokyo (JP); Hiroyuki Kuriyama, Tokyo (JP); Kiminori Sato, Tokyo (JP)

(73) Assignee: LOGISTEED, LTD., Tokyo (JP)

( * ) Notice: Subject to any disclaimer, the term of this patent is extended or adjusted under 35 U.S.C. 154(b) by 304 days.

(21) Appl. No.: 17/772,328

(22) PCT Filed: Oct. 20, 2020

(86) PCT No.: PCT/JP2020/039445
§ 371 (c)(1),
(2) Date: Apr. 27, 2022

(87) PCT Pub. No.: WO2021/085251
PCT Pub. Date: May 6, 2021

(65) Prior Publication Data
US 2022/0404161 A1    Dec. 22, 2022

(30) Foreign Application Priority Data
Oct. 29, 2019   (JP) ................................. 2019-195877

(51) Int. Cl.
*G01C 21/34*   (2006.01)
*G01C 21/20*   (2006.01)
(Continued)

(52) U.S. Cl.
CPC ......... *G01C 21/3484* (2013.01); *G01C 21/20* (2013.01); *G06Q 10/06311* (2013.01); *G08G 1/0133* (2013.01)

(58) Field of Classification Search
None
See application file for complete search history.

(56) References Cited

U.S. PATENT DOCUMENTS

| | | | |
|---|---|---|---|
| 2006/0069559 A1 | 3/2006 | Ariyoshi et al. | |
| 2012/0259542 A1* | 10/2012 | Hunig | G01C 21/3415 |
| | | | 701/538 |

(Continued)

FOREIGN PATENT DOCUMENTS

| CN | 104641406 A | 5/2015 |
|---|---|---|
| CN | 106133801 A | 11/2016 |

(Continued)

OTHER PUBLICATIONS

PCT/JP2020/039445 International Search Report mailed Dec. 1, 2020. 6 pages.

(Continued)

*Primary Examiner* — Adam D Tissot
(74) *Attorney, Agent, or Firm* — Volpe Koenig

(57) ABSTRACT

A system for generating guidance information for a driver includes a processor and a storage device. The storage device stores guidance history of the driver. The processor generates a feature value based on match/mismatch of guidance types abstracted from the guidance history. The processor determines a guidance type for the driver on the basis of the feature value. The processor generates information for issuing guidance of the determined guidance type to the driver according to driver monitoring information.

6 Claims, 10 Drawing Sheets

(51) Int. Cl.
    *G06Q 10/063*    (2023.01)
    *G06Q 10/0631*   (2023.01)
    *G08G 1/01*       (2006.01)

(56) References Cited

U.S. PATENT DOCUMENTS

| | | |
|---|---|---|
| 2013/0302756 A1 | 11/2013 | Takeuchi et al. |
| 2015/0262484 A1 | 9/2015 | Victor et al. |
| 2017/0098371 A1 | 4/2017 | Ujiie et al. |
| 2018/0052458 A1 | 2/2018 | Tsuji et al. |
| 2018/0074497 A1 | 3/2018 | Tsuji et al. |
| 2018/0093676 A1 | 4/2018 | Emura et al. |
| 2018/0105185 A1 | 4/2018 | Watanabe et al. |
| 2018/0105186 A1 | 4/2018 | Motomura et al. |
| 2018/0354529 A1* | 12/2018 | Ota .................. B60W 50/0097 |
| 2019/0168772 A1 | 6/2019 | Emura et al. |

FOREIGN PATENT DOCUMENTS

| | | |
|---|---|---|
| CN | 107531245 A | 1/2018 |
| CN | 107531252 A | 1/2018 |
| EP | 3272610 A1 | 1/2018 |
| JP | 2006-113546 A | 4/2006 |
| JP | 2012-113631 A | 6/2012 |
| JP | 2016-216021 A | 12/2016 |
| JP | 2018-49477 A | 3/2018 |
| JP | 2018049477 A * | 3/2018 |

OTHER PUBLICATIONS

Chinese Office Action issued on Feb. 1, 2024 for Chinese Patent Application No. 202080076428.8.

* cited by examiner

| | 201 | 202 | 203 | 204 | 205 | 206 | 11 |
|---|---|---|---|---|---|---|---|
| | VEHICLE ID | DRIVER ID | DATE/TIME | SPEED | ACCELERATION | FOLLOWING DISTANCE | ... |
| | C0001 | D0001 | 2019-09-18 12:00:00 | 45 | 0.01 | 6 | ... |
| | C0001 | D0001 | 2019-09-18 12:00:01 | 45 | 0.08 | 7 | ... |
| | C0001 | D0001 | 2019-09-18 12:00:02 | 43 | 0.13 | 8 | ... |
| | ... | ... | ... | ... | ... | ... | ... |

VEHICLE MEASUREMENT DATA

*FIG. 2*

| 221 | 222 | 223 | 224 | 225 | 226 | 227 | 228 | 12 |
|---|---|---|---|---|---|---|---|---|
| VEHICLE ID | DRIVER ID | START DATE/TIME | END DATE/TIME | AVERAGE SPEED | MAXIMUM SPEED | MINIMUM SPEED | TIME LENGTH | ... |
| C0001 | D0001 | 2019-09-18 12:00:00 | 2019-09-18 12:00:54 | 44 | 46 | 39 | 54 | ... |
| C0001 | D0001 | 2019-09-18 14:11:04 | 2019-09-18 14:11:44 | 78 | 79 | 70 | 40 | ... |
| C0001 | D0001 | 2019-09-18 16:22:42 | 2019-09-18 16:23:11 | 56 | 60 | 53 | 29 | ... |
| ... | ... | ... | ... | ... | ... | ... | ... | ... |

DRIVING FEATURE VALUE DATA

*FIG. 3*

```
IF AVERAGE SPEED > 60 AND TIME LENGTH > 30 AND ... THEN DANGER LEVEL 1
IF MAXIMUM SPEED > 100 AND MINIMUM SPEED < 50 AND ... THEN DANGER LEVEL 2
...
```

DANGER TYPE DETERMINATION RULES

*FIG. 4*

| VEHICLE ID | DRIVER ID | START DATE/TIME | END DATE/TIME | AVERAGE SPEED | MAXIMUM SPEED | MINIMUM SPEED | TIME LENGTH | ... | DANGER TYPE |
|---|---|---|---|---|---|---|---|---|---|
| C0001 | D0001 | 2019-09-18 12:00:00 | 2019-09-18 12:00:54 | 44 | 46 | 39 | 54 | ... | — |
| C0001 | D0001 | 2019-09-18 14:11:04 | 2019-09-18 14:11:44 | 78 | 79 | 70 | 40 | ... | DANGER 1 |
| C0001 | D0001 | 2019-09-18 16:22:42 | 2019-09-18 16:23:11 | 56 | 60 | 53 | 29 | ... | DANGER 2 |
| ... | ... | ... | ... | ... | ... | ... | ... | ... | ... |

DANGER TYPE DETERMINATION RESULTS

*FIG. 5*

| DANGER TYPE | DESCRIPTION OF DANGER TYPE | GUIDANCE TYPE | GUIDANCE CONTENT |
|---|---|---|---|
| DANGER 1 | INSUFFICIENT FOLLOWING DISTANCE (FREEWAY) | GUIDANCE 1 | INCREASE FOLLOWING DISTANCE |
| DANGER 2 | INSUFFICIENT FOLLOWING DISTANCE (LOCAL STREET) | GUIDANCE 2 | INCREASE FOLLOWING DISTANCE |
| DANGER 3 | DELAYED DECELERATION PRIOR TO STOPPING | GUIDANCE 3 | CONFIRM TIMING TO START DECELERATION |
| ... | ... | ... | ... |

GUIDANCE MASTER

*FIG. 6*

| DRIVER ID | DANGER TYPE | GUIDANCE CONTENT | ESTIMATED IMPROVEMENT DEGREE |
|---|---|---|---|
| D0001 | DANGER 1 | INCREASE FOLLOWING DISTANCE | 20 |
| D0002 | DANGER 2 | INCREASE FOLLOWING DISTANCE | 12 |
| D0003 | DANGER 3 | CONFIRM TIMING TO START DECELERATION | 14 |
| ... | ... | ... | ... |

FOR-GUIDANCE DANGER TYPE DATA

*FIG. 7*

| 301 | 302 | 303 | 304 | 17 |
|---|---|---|---|---|
| DRIVER ID | GUIDANCE DATE | GUIDANCE TYPE | DANGER TYPE | |
| D0001 | 2019-08-18 | GUIDANCE 1 | DANGER 1 | |
| D0001 | 2019-08-19 | GUIDANCE 2 | DANGER 2 | |
| D0001 | 2019-08-20 | GUIDANCE 1 | DANGER 1 | |
| ... | ... | ... | ... | |

GUIDANCE HISTORY

FIG. 8

| DRIVER ID | REFERENCE DATE | GUIDANCE TYPE | NUMBER OF INSTANCES OF GUIDANCE WITHIN N DAYS | NUMBER OF GUIDANCE TYPES WITHIN N DAYS | GREATEST NUMBER OF CONSECUTIVE DAYS WITHIN N DAYS THAT SPECIFIC GUIDANCE WAS ISSUED | NUMBER OF INSTANCES OF SAME GUIDANCE AS REFERENCE DATE WITHIN N DAYS |
|---|---|---|---|---|---|---|
| D0001 | 2019-09-18 | GUIDANCE 1 | 10 | 3 | 5 | 5 |
| D0001 | 2019-09-18 | GUIDANCE 2 | 10 | 3 | 5 | 3 |
| D0001 | 2019-09-18 | GUIDANCE 3 | 10 | 3 | 5 | 1 |
| ... | ... | ... | ... | ... | ... | ... |
| D0002 | 2019-09-18 | GUIDANCE 1 | 10 | 5 | 3 | 2 |
| ... | ... | ... | ... | ... | ... | ... |

GUIDANCE HISTORY FEATURE VALUE DATA

FIG. 9

| 341 | 342 | 343 | 20 |
|---|---|---|---|
| DRIVER ID | GUIDANCE DATE | DRIVING SCORE IMPROVEMENT DEGREE | |
| D0001 | 2019-08-18 | 18 | |
| D0001 | 2019-08-19 | 21 | |
| D0001 | 2019-08-20 | 9 | |
| ... | ... | ... | |

DRIVING SCORE IMPROVEMENT DEGREE DATA

FIG. 10

| DRIVER ID | REFERENCE DATE | NUMBER OF INSTANCES OF GUIDANCE WITHIN N DAYS | NUMBER OF GUIDANCE TYPES WITHIN N DAYS | GREATEST NUMBER OF CONSECUTIVE DAYS WITHIN N DAYS THAT SPECIFIC GUIDANCE WAS ISSUED | NUMBER OF INSTANCES OF SAME GUIDANCE AS REFERENCE DATE WITHIN N DAYS |
|---|---|---|---|---|---|
| D0001 | 2019-07-21 | 10 | 3 | 5 | 5 |
| D0002 | 2019-07-21 | 10 | 5 | 3 | 2 |
| D0003 | 2019-07-21 | 9 | 5 | 2 | 1 |
| ... | | ... | ... | ... | ... |

TRAINING GUIDANCE HISTORY FEATURE VALUE DATA

| DRIVER ID (381) | START DATE/TIME (382) | END DATE/TIME (383) | TASK (384) |
|---|---|---|---|
| D0001 | 2019-09-18 08:30:00 | 2019-09-18 08:50:00 | VEHICLE INSPECTION |
| D0001 | 2019-09-18 08:50:00 | 2019-09-18 09:20:00 | LOADING |
| D0001 | 2019-09-18 09:20:00 | 2019-09-18 09:40:00 | TRAVEL TO DESTINATION 1 |
| ... | ... | ... | ... |

WORK PLAN (IN WORK INFORMATION)

FIG. 21

| DRIVER ID (401) | DATE/TIME (402) | CURRENT STATE (403) |
|---|---|---|
| D0001 | 2019-09-18 09:30:00 | TRAVELING |
| D0001 | 2019-09-18 09:31:00 | TRAVELING |
| D0001 | 2019-09-18 09:32:00 | ARRIVAL TO DESTINATION 1 |
| ... | ... | ... |

WORK PROGRESS (IN WORK INFORMATION)

FIG. 22

SYSTEM FOR GENERATING GUIDANCE INFORMATION

CLAIM OF PRIORITY

The present application claims priority from Japanese patent application JP2019-195877 filed on Oct. 29, 2019, the content of which is hereby incorporated by reference into this application.

BACKGROUND

The present disclosure relates to a system that generates guidance information.

Patent Document 1 discloses a "device that aids a company possessing a plurality of vehicles provided with vehicle-installed terminals 3, travel information collected by the vehicle-installed terminals 3 being processed to create processed information, prediction information regarding a traffic crash included in the processed information being detected, and a guidance proposal for traffic safety pertaining to the prediction information being retrieved to create a guidance document" (e.g., see abstract).

RELATED ART DOCUMENT

Patent Document 1: JP 2006-113546 A

SUMMARY

Patent Document 1 can implement guidance regarding driving that has the highest degree of danger within a prescribed period and that is predicted to cause a crash.

However, there is the possibility of problems pertaining to human characteristics occurring, such problems including that if the same guidance is continuously repeated, the recipient becomes inured to the guidance, resulting in the expected effect of guidance not being achieved, that the guidance can be forgotten if no guidance is received for an extended period of time, that if a large amount of guidance is concentrated over a short period of time, the recipient of the guidance has difficulty remembering all of the guidance, and the like. Thus, a technique by which information is generated to issue guidance more effectively is desired.

A representative embodiment of the present disclosure is a system for generating guidance information for a driver, the system including: one or more processors; and one or more storage devices that store a command code to be executed by the one or more processors, wherein the one or more storage devices store guidance history of the driver, and wherein the one or more processors generate a feature value based on match/mismatch of guidance types abstracted from the guidance history, determine a guidance type for the driver on the basis of the feature value, and generate information for issuing guidance of the determined guidance type to the driver according to driver monitoring information.

According to a representative embodiment of the present invention, it is possible to generate information to issue guidance more effectively. Problems, configurations, and effects other than what was described above are made clear by the description of embodiments below.

BRIEF DESCRIPTION OF THE DRAWINGS

FIG. 2 shows a configuration example of vehicle measurement data.

FIG. 3 shows a configuration example of driving feature value data.

FIG. 4 shows an example of danger type determination rules.

FIG. 5 shows a configuration example of danger type determination results.

FIG. 6 shows a configuration example of a guidance master.

FIG. 7 shows a configuration example of for-guidance danger type data.

FIG. 8 shows a configuration example of a guidance history.

FIG. 9 shows a configuration example of guidance history feature value data.

FIG. 10 shows a configuration example of driving score improvement degree data.

FIG. 21 shows a configuration example of an operation plan.

FIG. 22 shows a configuration example of operation progress.

DETAILED DESCRIPTION OF EMBODIMENTS

Figure 1A:
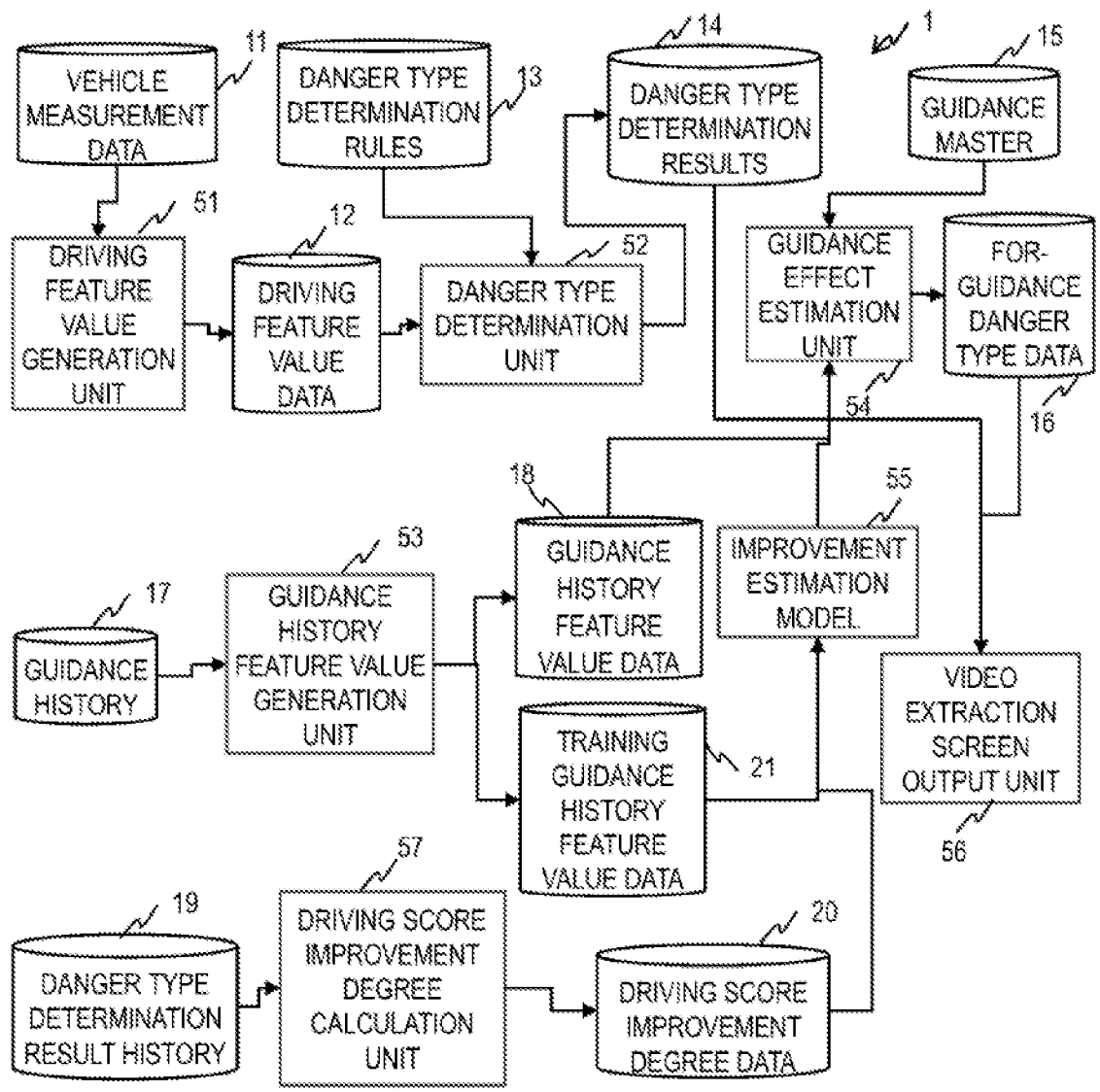
FIG. 1A shows a logic configuration example of a guidance information provision system according to Embodiment 1.

Embodiments will be described below with reference to drawings. In the configurations of the invention described below, same or similar configurations or functions are assigned the same reference characters, and redundant explanations thereof are omitted.

Embodiment 1

Below, an example will be described of a guidance information provision system that detects dangerous situations from the behavior of a vehicle, and generates and presents information for issuing guidance to a driver. The guidance information provision system of this example aids effective guidance for safe driving to a driver of a freight- or passenger-carrying vehicle by generating information for guidance from vehicle observation information that records vehicle behavior from driving performed on the same day during roll call performed after the end of operations, and determining the guidance type effective for each drive on the basis of past guidance history. For example, safety guidance is aided by detecting dangerous situations by analyzing the vehicle behavior of a truck, and, during roll call conducted after the driver of the truck has completed operations and returned to the office, showing a short video of the dangerous situations that occurred that day.

Due to the operational schedule, daily guidance is limited to a few minutes after returning to the office, and it is necessary to issue effective safety guidance during this limited time. Specifically, video of instances of dangerous driving that occurred that day is outputted upon the return of the driver to the office, the video is watched with a manager present, and the manager issues guidance accordingly. How the daily guidance content is put together is important for effective guidance. Even if the degree of danger were high, if the same guidance were repeated day after day, the driver could become inured and not absorb the guidance, and thus, it is important to determine daily guidance content in consideration of this human characteristic.

Studies by inventors of the present invention have found that a feature value regarding whether the types of guidance are the same or different within the guidance history is important for promoting continuous growth in people, rather than the type of guidance (guidance content) itself, and that there is no need to create a feature value for each guidance type (guidance content). In the present embodiment, feature values of guidance history based on whether the guidance types abstracted from the guidance history are the same or different can be calculated to estimate effective guidance. By focusing on whether the guidance types are the same or different, it is possible to reduce the number of feature values that need to be calculated, and it is possible to reduce the quantity of necessary training data.

Below, an example is described in which guidance is issued to a driver of a truck on the basis of the driving behavior of the driver of the truck over one given day, but the characteristics of the present disclosure are not limited to the driving of a truck and can also be applied to guidance for driving other vehicles such as taxis and cargo handling vehicles. The driving period subject to guidance is also not limited to one day and instead may be multiple days, a few hours within a day, or the like, for example.

FIG. 1A shows a logic configuration example of a guidance information provision system. The guidance information provision system 1 includes functional units that execute processes and information (data) generated, updated, and used by the functional units. The information includes vehicle measurement data 11, driving feature value data 12, danger type determination rules 13, danger type determination results 14, a guidance master 15, for-guidance danger type data 16, a guidance history 17, guidance history feature value data 18, a danger type determination result history 19, driving score improvement degree data 20, and training guidance history feature value data 21.

The functional units include a driving feature value generation unit 51, a danger type determination unit 52, a guidance history feature value generation unit 53, a guidance effect estimation unit 54, an improvement estimation model 55, a video extraction screen output unit 56, and a driving score improvement degree calculation unit 57. The functional units can be realized by a processor that operates according to programs (command code), logic circuits, or a combination thereof, for example.

The driving feature value generation unit 51 generates the driving feature value data 12 according to the vehicle measurement data 11 of a vehicle(s) driven by one or more drivers. The danger type determination unit 52 generates the danger type determination results 14 according to the driving feature value data 12 on the basis of the danger type determination rules 13. The guidance history feature value generation unit 53 generates the guidance history feature value data 18 according to the guidance history 17 of each driver and the guidance type candidates of the current guidance. Also, the guidance history feature value generation unit 53 generates the training guidance history feature value data 21 according to the guidance history 17.

The guidance effect estimation unit 54 uses the trained improvement estimation model 55 to estimate the driving improvement degree of each guidance type candidate of each driver according to the guidance history feature value data 18. The guidance effect estimation unit 54 selects one or more guidance types from among the guidance type candidates for each driver on the basis of the driving improvement degree. The guidance effect estimation unit 54 determines the danger type corresponding to the guidance type selected from among one or more guidance types selected for each driver with reference to the guidance master 15 and generates the for-guidance danger type data 16.

The video extraction screen output unit 56 extracts a screen to be used for guidance from driving footage captured by a drive recorder of each driver on the basis of the danger type determination results 14 and the for-guidance danger type data 16, and generates and displays the guidance screen for each driver. The improvement estimation model 55 is trained using the driving score improvement degree data 20 and the training guidance history feature value data 21 as training data. The driving score improvement degree data 20 is generated by the driving score improvement degree calculation unit 57 according to the danger type determination result history 19.

Figure 1B:
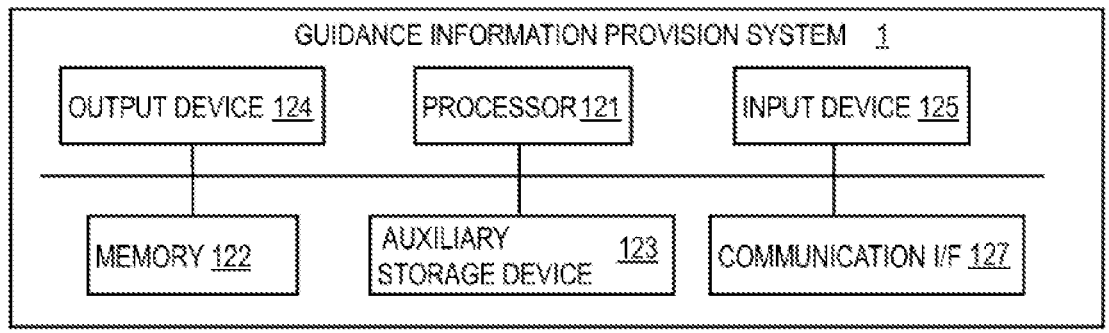
FIG. 1B shows a hardware configuration example of a guidance information provision system 1.

FIG. 1B shows a hardware configuration example of the guidance information provision system 1. The guidance information provision system 1 can have the configuration of a computer. The guidance information provision system 1 includes a processor 121, a memory (primary storage device) 122, an auxiliary storage device 123, an output device 124, an input device 125, and a communication interface (I/F) 127. These constituent elements are connected to each other by a bus. The memory 122, the auxiliary storage device 123, or a combination thereof is a storage device, and stores programs and data used by the processor 121.

The memory 122 is constituted of a semiconductor memory, for example, and is primarily used to store programs currently being executed and data. The processor 121 executes various processes according to programs stored in the memory 122. Various functional units are realized as a result of the processor 121 operating according to the programs.

By operating according to the corresponding programs, the processor 121 functions as the driving feature value generation unit 51, the danger type determination unit 52, the guidance history feature value generation unit 53, the guidance effect estimation unit 54, the improvement estimation model 55, the video extraction screen output unit 56, and the driving score improvement degree calculation unit 57.

The auxiliary storage device 123 is constituted of a large capacity storage device such as a hard disk drive or a solid state drive, and is used for longterm storage of programs and data.

The processor 121 can be constituted of one or more processing units, and can include one or more computation units or a plurality of processing cores. The processor 121 can have installed therein one or more central processing units, a microprocessor, a microcomputer, a microcontroller, a digital signal processor, a state machine, a logic circuit, a graphics processing unit, a system-on-a-chip, and/or a given device that operates signals on the basis of a control instruction.

The programs and data stored in the auxiliary storage device 123 are loaded to the memory 122 during start up or as necessary, and the programs are executed by the processor 121, thereby causing the various processes of the guidance information provision system 1 to be executed. Thus, the processes executed by the guidance information provision system 1 below are processes by the processor 121 or the programs.

The input device 125 is a hardware device for the user to input instructions and information to the guidance information provision system 1. The output device 124 is a hardware device for presenting various images for input and output, and is a display device or a printing device, for example. The communication I/F 127 is an interface for connecting to the network.

The functions of the guidance information provision system 1 can be installed in a computer system constituted of one or more computers including one or more processors and one or more storage devices that include a non-transitory storage medium. The plurality of computers communicate via the network. A configuration may be adopted in which some of a plurality of functions of the guidance information provision system 1 are installed in one computer and other functions are installed in another computer.

Below, an example of information retained in the guidance information provision system 1 will be described. In the example described below, various information is stored in tables, but the information may be stored in any type of data structure. In the example described below, during guidance (one round of guidance) for one target driving period of each driver, one type of guidance is issued. As a result, it is possible to increase the effect of each guidance to the driver. During one round of guidance, multiple guidance types (multiple instances of guidance) may be issued. As a result, it is possible to issue guidance for multiple types of dangerous driving during the guidance period.

FIG. 2 shows a configuration example of the vehicle measurement data 11. The vehicle measurement data 11 stores measurement data for the behavior of a vehicle driven by each of one or more drivers. The vehicle measurement data is measured by a measurement system installed in the vehicle. The vehicle measurement data 11 is included in driver monitoring information together with footage from a drive recorder (not shown). In the example of FIG. 2, the vehicle measurement data 11 includes a vehicle ID column 201, a driver ID column 202, a date/time column 203, a speed column 204, an acceleration column 205, and a following distance column 206.

The vehicle ID column 201 and the driver ID column 202 respectively indicate the ID of the vehicle for which data was measured and the ID of the driver. The date/time column 203 indicates the date and time at which the data was measured. The speed column 204, the acceleration column 205, and the following distance column 206 respectively indicate the speed, acceleration, and following distance of the vehicle.

In the example of FIG. 2, the measurement values are recorded over a given interval (e.g., 1 second). The driver records their own information to a vehicle-installed device when on duty. Thus, the vehicle measurement data 11 can include the vehicle ID and the driver ID. Any structure may be used for the vehicle measurement data 11, and a vehicle measurement table may be separate from a table indicating the relationship between the vehicle and driver on each workday. The speed, acceleration, and following distance are examples of measurement data, and other measurement values may be stored instead thereof or in addition thereto.

FIG. 3 shows a configuration example of the driving feature value data 12. As described above, the driving feature value data 12 is generated from the vehicle measurement data 11. The driving feature value data 12 stores feature values of the vehicle measurement data for each driver. In the example of FIG. 3, each record indicates information for each time period separated according to preset rules.

In each time period, the driving danger type is determined, and guidance of a given guidance type is performed according to information from each time interval. Thus, by dividing the measurement data of the driving history into multiple time periods, it is possible to suitably extract instances of dangerous driving by the driver, and additionally, to easily and suitably extract scenarios for guidance from the footage indicating the driving history of the driver.

In the example of FIG. 3, the driving feature value data 12 includes a vehicle ID column 221, a driver ID column 222, a start date/time column 223, an end date/time column 224, an average speed column 225, a maximum speed column 226, a minimum speed column 227, and a time length column 228. The average speed column 225, the maximum speed column 226, the minimum speed column 227, and the time length column 228 indicate feature values for determining the level of danger.

The vehicle ID column 221 and the driver ID column 222 respectively indicate the ID of the vehicle and the ID of the driver. The start date/time column 223 and the end date/time column 224 indicate the start date/time and end date/time of the time period of each record. The average speed column 225, the maximum speed column 226, and the minimum speed column 227 indicate the average speed, the maximum speed, and the minimum speed during the time period of each record. Determination regarding the level of danger is executed for each record, or in other words, each time period of each combination of vehicle and driver. The feature values indicated in FIG. 3 constitute one example, and other feature values may be included in addition thereto or instead of some of the feature values indicated in FIG. 3.

FIG. 4 shows an example of the danger type determination rules 13. The danger type determination rules 13 indicate rules for determining the danger type for driving in each time period according to feature values of each time period indicated by the driving feature value data 12. The danger type determination rules 13 are set in advance. Determination of the danger type is made by determining whether there were instances of dangerous driving during the target time period, and, if there were instances of dangerous driving, determining the types thereof.

An example of steps for generating danger type determination rules 13 will be described. For example, multiple samples (e.g., several hundred cases) are extracted from past driving feature value data. Footage (drive recorder, etc.) from the vehicle at the time period is observed for each sample, and tags are assigned to determine whether dangerous driving has occurred, whether the cause of the dangerous driving is the driver of the vehicle (own responsibility) or another driver (other driver's responsibility), the types of dangerous situations (following distance being too short, start of deceleration being delayed, etc.), and the like. In this case, external environmental information such as whether the road on which the vehicle was traveling at the time of dangerous driving is a freeway or a local street, and whether there was traffic congestion may also be added as tags.

Supervised learning in which the driving feature values are classified as predictor variables and the tags are classified as response variables is performed to generate a model of danger type determination rules. FIG. 4 shows content of a decision tree model. The format for the danger type determination rules 13 is not limited to the example of FIG. 4. The format for the danger type determination rules 13 depends of the learning library used.

FIG. 5 shows a configuration example of the danger type determination results 14. The danger type determination results 14 indicate determination results regarding the danger type for each record of the driving feature value data 12. As described above, the danger type determination results 14 are generated by the danger type determination unit 52 according to the driving feature value data 12. The danger type determination result history 19 is a history of past danger type determination results 14 and can have the same table structure as the danger type determination results 14.

The danger type determination results 14 include a vehicle ID column 241, a driver ID column 242, a start date/time column 243, an end date/time column 244, an average speed column 245, a maximum speed column 246, a minimum speed column 247, a time length column 248, and a danger type column 249. Columns other than the danger type column 249 are similar to the columns of the driving feature value data 12. The danger type column 249 indicates the danger type for driving of each record in the example of FIG. 5. If the driving does not constitute dangerous driving, then a hyphen is placed in the danger type column 249.

FIG. 6 shows a configuration example of the guidance master 15. The guidance master 15 associates the danger type with the guidance type. The guidance master 15 is set in advance. In the example of FIG. 6, the guidance master 15 has a danger type column 261, a danger type description column 262, a guidance type column 263, and a guidance content column 264. The danger type description column 262 has a description for each danger type indicated in the danger type column 261. The guidance type column 263 indicates the guidance type corresponding to each danger type indicated in the danger type column 261. The guidance content column 264 indicates the guidance content for each guidance type indicated in the guidance type column 263.

FIG. 7 shows a configuration example of the for-guidance danger type data 16. The for-guidance danger type data 16 indicates information regarding guidance for which a decision was made to issue the guidance to each driver. As described above, the for-guidance danger type data 16 is generated by the guidance effect estimation unit 54 using the improvement estimation model 55 on the basis of the guidance master 15 and the guidance history feature value data 18.

In the example of FIG. 7, the for-guidance danger type data 16 includes a driver ID column 281, a danger type column 282, a guidance content column 283, and an estimated improvement degree column 284. The driver ID column 281 indicates the ID of each driver issued guidance. The danger type column 282 indicates the danger type for which guidance is issued to each driver. The guidance content column 283 shows an example of a guidance content for each driver. The estimated improvement degree column 284 indicates the degree of improvement in driving estimated according to the corresponding guidance content for each driver.

FIG. 8 shows a configuration example of the guidance history 17. The guidance history 17 indicates the actual past guidance history for each driver. The guidance history 17 is updated by a user or the guidance information provision system 1 (e.g., the guidance effect estimation unit 54), for example.

In the example of FIG. 8, the guidance history 17 has a driver ID column 301, a guidance date column 302, a guidance type column 303, and a danger type column 304. The driver ID column 301 indicates the ID of the driver issued guidance. The guidance date column 302 indicates the date at which guidance was issued to the driver. In this example, one round of guidance is issued for driving for work on a given day. The guidance type column 303 and the danger type column 304 indicate the guidance of one round of guidance and the danger type subject to guidance.

FIG. 9 shows a configuration example of the guidance history feature value data 18. The guidance history feature value data 18 indicates feature values of the guidance history of each driver. As described above, the guidance history feature value data 18 is generated from the guidance history 17 by the guidance history feature value generation unit 53. Each record indicates information corresponding to one guidance type candidate for one driver. The guidance history feature value data 18 includes records for all guidance type candidates for the respective drivers, for example.

In the example of FIG. 9, the guidance history feature value data 18 includes a driver ID column 321, a reference date column 322, a guidance type column 323, a column 324 indicating the number of instances of guidance within N days, a column 325 indicating the number of types of guidance within N days, a column 326 indicating the greatest number of consecutive days within N days that specific guidance was issued, and a column 327 indicating the number of instances of the same guidance being issued as the reference date within N days. The column 324 indicating the number of instances of guidance within N days, the column 325 indicating the number of types of guidance within N days, the column 326 indicating the greatest number of consecutive days within N days that specific guidance was issued, and the column 327 indicating the number of instances of the same guidance being issued as the reference date within N days are feature values for selecting the danger type subject to guidance. N is the prescribed number of days. A configuration may be adopted in which only some (at least one) of the above-mentioned values are used as the feature values for selecting the danger type subject to guidance. As a result of these feature values, it is possible to select the danger type columns with the greatest guidance effect.

The driver ID column 321 indicates the ID of the driver to be issued guidance. The reference date column 322 indicates a reference date for calculating the feature values in the guidance history, and in the example of FIG. 9 is the number of work days for which guidance is to be issued. The guidance type column 323 indicates the guidance type candidate for guidance to be issued to the driver. The guidance type candidate is a candidate for guidance types regarding driving on a work day for which guidance is to be issued. All defined guidance types are candidates, for example.

The column 324 indicating the number of instances of guidance within N days indicates the number of instances of guidance issued within the past N days from the reference date. N is an integer of 2 or greater, and the number of instances of guidance includes guidance type candidates on the reference date. In this example, guidance belonging to one guidance type column during one round of guidance is issued, and thus, the number of instances of guidance, the number of days for which guidance is conducted, and the number of rounds of guidance are the same. If multiple instances (multiple types) of guidance are issued during one round of guidance, the number of instances of guidance is the sum total of the rounds of guidance (number of guidance types). If, for example, N is 2, guidance 1 and guidance 2 are issued on a date prior to the reference date, and the guidance type candidate on the reference date is only the guidance 2, then the number of instances of guidance is 3.

The column 325 indicating the number of types of guidance within N days indicates the number of types of guidance issued within the past N days from the reference date. The types of guidance to be counted includes guidance type candidates on the reference date. If, for example, N is 5, the guidance types over the past four days are the guidance 1, the guidance 2, the guidance 2, and the guidance 2, and the guidance type candidate on the reference date is the guidance 1, then the number of types of guidance is 2. A similar count can be made even if multiple instances (multiple types) of guidance are issued during one round of guidance. If, for example, N is 2, guidance 1 and guidance 2 are issued on a date prior to the reference date, and the guidance type candidate on the reference date is only the guidance 2, then the number of types of guidance is 2.

The column 326 indicating the greatest number of consecutive days within N days that specific guidance was issued indicates the maximum number of consecutive days that a given type of guidance was consecutively issued within the past N days from the reference date. If, for example, N is 5, the guidance types over the past four days are the guidance 1, the guidance 2, the guidance 2, and the guidance 2, and the guidance type candidate on the reference date is the guidance 1, then the maximum number of consecutive days is 3. A similar count can be made even if multiple instances (multiple types) of guidance are issued during one round of guidance.

The column 327 indicating the number of instances of the same guidance being issued as the reference date within N days indicates the number of instances of guidance of the same type as the guidance type candidate of the reference date issued within the past N days from the reference date. If, for example, N is 5, the guidance types over the past four days are the guidance 1, the guidance 2, the guidance 2, and the guidance 2, and the guidance type candidate on the reference date is the guidance 1, then the value of the column 327 is 1. If multiple guidance type candidates exist on the reference date, the value of the column 327 may be the sum total of the number of instances of the same types of guidance as the respective multiple guidance type candidates, for example. If, for example, N is 5, the guidance types over the past four days are the guidance 1, the guidance 2, the guidance 3, and the guidance 2, and the guidance type candidates on the reference date are the guidance 1 and the guidance 2, then the value of the column 327 is 3.

As shown in the example of FIG. 9, the guidance history feature value data 18 indicates the feature value of the guidance history attained by abstracting the guidance types and performing calculation from the perspective of whether the guidance types are the same as or different from each other. The feature values calculated from the guidance history of the guidance 1, the guidance 2, the guidance 1, and the guidance (candidate) 3 are the same as the feature values calculated from the guidance history of the guidance 3, the guidance 1, the guidance 3, and the guidance (candidate) 2. It is possible to estimate effective guidance from the feature values of the guidance history on the basis of whether the guidance types are the same or different, and by a small amount of calculation and training data of the improvement estimation model 55.

In the example of FIG. 9, the greatest number of consecutive days within N days that specific guidance was issued is an example of a feature value indicating whether the guidance types are the same or different. Another example of a feature value indicating patterns of match/mismatch in the guidance types is a bit sequence indicating match or mismatch with the guidance types of the previous day. Thus, by including feature values that indicate a pattern of match/mismatch of the guidance types, it is possible to more effectively estimate the guidance types. As shown in the example of FIG. 9, by setting the guidance date of a work day for which guidance is to be issued, it is possible to determine a more suitable guidance type for driving on the work day.

FIG. 10 shows a configuration example of the driving score improvement degree data 20. The driving score improvement degree data 20 indicates the degree of improvement in the driving score in the past guidance history, and is training data used for training the improvement estimation model 55. As described above, the driving score improvement degree data 20 is generated by the driving score improvement degree calculation unit 57 according to the danger type determination result history 19.

Each record indicates information on one round of guidance. In the example of FIG. 10, the driving score improvement degree data 20 includes a driver ID column 341, a guidance date column 342, and a driving score improvement degree column 343. The driver ID column 341 and the guidance date column 342 respectively indicate the ID of the driver to be issued guidance and the date at which the guidance was issued. The driving score improvement degree column 343 indicates the improvement degree of the driving score due to guidance.

A driving score Sd on a given date d is represented by the following formula, for example.

$$SD = (k_{1,d}(\text{number of instances of danger 1}) + k_{1,d}(\text{number of instances of danger 2}) + \ldots)/\text{driving time}$$

$k_{1,d}$ and $k_{1,d}$ are coefficients assigned in advance to the danger type 1 and the danger type 2, respectively. A coefficient is assigned in advance to every danger type. The coefficient is set such that the lower the number of instances of dangerous driving is, the greater the driving score Sd is, for example.

The driving score improvement degree is represented by a value attained by subtracting the average driving score over M days (e.g., 7 days) before the date d (pre-guidance driving score) from the average driving score over L days (e.g., 7 days) from the day following the date d (post-guidance driving score), for example. L and M are integers of 2 or greater. Any calculation method may be used for the driving score indicating the degree of safety of driving and the driving score improvement degree indicating the degree of improvement thereof, and the calculation methods are not limited to what was described above.

Figures 11, 12:
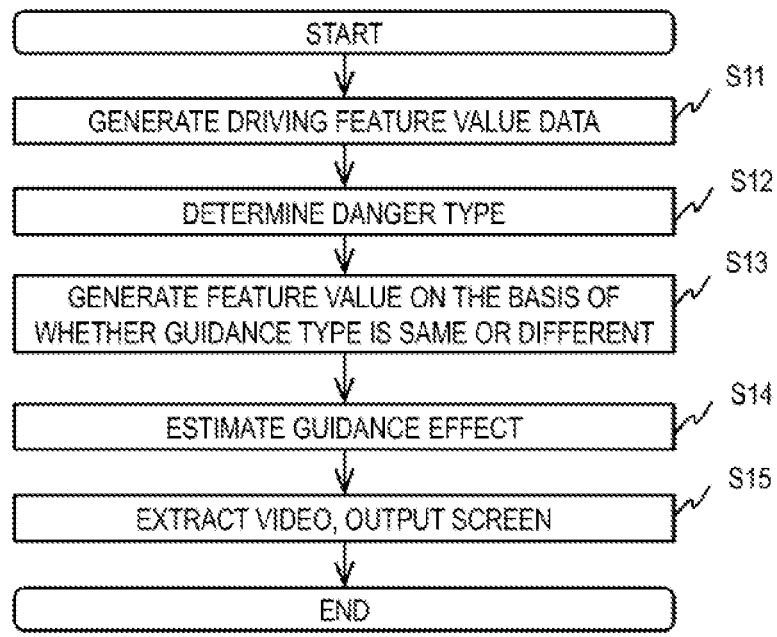
FIG. 11 shows a configuration example of a training guidance history feature value data.
FIG. 12 shows a flowchart of the primary process of the guidance information provision system.

FIG. 11 shows a configuration example of the training guidance history feature value data 21. The training guidance history feature value data 21 indicates the feature value in the guidance history of each driver, and is training data used for training the improvement estimation model 55. As described above, the training guidance history feature value data 21 is generated from the guidance history 17 by the guidance history feature value generation unit 53.

In the example of FIG. 11, the training guidance history feature value data 21 includes a driver ID column 361, a reference date column 362, a column 363 indicating the number of instances of guidance within N days, a column 364 indicating the number of types of guidance within N days, a column 365 indicating the greatest number of consecutive days within N days that specific guidance was issued, and a column 366 indicating the number of instances of the same guidance being issued as the reference date within N days. The configuration of the training guidance history feature value data 21 is a table configuration that omits the guidance type column 323 from the guidance history feature value data 18 shown in FIG. 9. The columns of the training guidance history feature value data 21 correspond to the columns of the same names, respectively, in the guidance history feature value data 18.

The driving score improvement degree data 20 and the training guidance history feature value data 21 are training data for the improvement estimation model 55. The inputs of the driving score improvement degree data 20 are the guidance history feature values (number of instances of guidance within N days, number of types of guidance within N days, greatest number of consecutive days within N days that specific guidance was issued, number of instances of the same guidance being issued as the reference date within N days). The output is the estimated value of the driving score improvement degree. The improvement estimation model 55 is represented as a linear function (linear regression model) of the training guidance history feature values, or in other words, the sum of products of a weighting coefficient and the training guidance history feature values. The weighting coefficient is a learning parameter. The configuration (function) of the improvement estimation model 55 is not limited to the example above.

Below, an example of a process of the guidance information provision system 1 will be described. Below, an example will be described in which dangerous situations for which guidance should be issued are extracted on the basis of the vehicle measurement data generated during travel during the day, and are outputted as a safety guidance screen together with video upon the return of the driver. For ease of description, an example will be described of generating and presenting information for guidance of one driver. A similar process can be executed for each of multiple drivers.

FIG. 12 shows a flowchart of the primary process of the guidance information provision system 1. FIG. 12 is a flowchart of a daily process for selecting a subject for guidance from driving data (vehicle measurement data) during the day. As shown in FIG. 12, the guidance information provision system 1 executes generation of driving feature value data (S11). Next, the guidance information provision system 1 executes determination of the danger type (S12). Next, the guidance information provision system 1 executes generation of feature values based on the match/mismatch in guidance types (S13). Next, the guidance information provision system 1 executes estimation of guidance effects (S14). Next, the guidance information provision system 1 executes extraction of video and output of a screen (S15).

Figure 13:
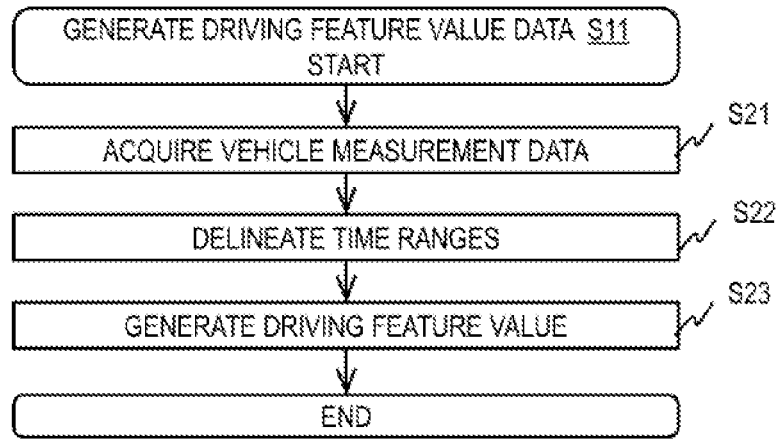
FIG. 13 shows a flowchart of details regarding driving feature value data generation.

The details of steps in the flowchart of FIG. 12 will be described in detail below. FIG. 13 shows a flowchart of details regarding driving feature value data generation S11.

First, the guidance information provision system 1 acquires vehicle measurement data 11 from a vehicle-installed sensor or the like (S21).

Next, the driving feature value generation unit 51 divides the vehicle measurement data 11 into multiple time periods according to preset rules (S22). The driving feature value generation unit 51 determines the time period into which to divide the data on the basis of the behavior of the vehicle indicated by the vehicle measurement data. The driving feature value generation unit 51 determines, as the time period to extract, a time period indicating characteristic behavior from the perspective of dangerous driving.

The driving feature value generation unit 51 determines, as the time period to extract, a time period in which a state continues where the following distance is less than or equal to a threshold, for example. If a state where the following distance is less than 10 m continues from 12:00:00 to 12:00:54, then this time period is extracted. Additionally, a time period where the speed exceeds a threshold, a time period where the acceleration exceeds a threshold, or the like can be extracted. A time period where no characteristic behavior is displayed between time periods where characteristic behavior is displayed is also determined as one time period.

The driving feature value generation unit 51 generates feature values indicating driving behaviors in the respective time periods. For example, average speed, maximum speed, minimum speed, speed deviation, time length, and the like in a given time period are defined as the feature values. However, these are merely examples and the feature values are not limited thereto. The driving feature value data 12 shown in FIG. 3 is generated by outputting data generated as described above in tabular format.

Figure 14:
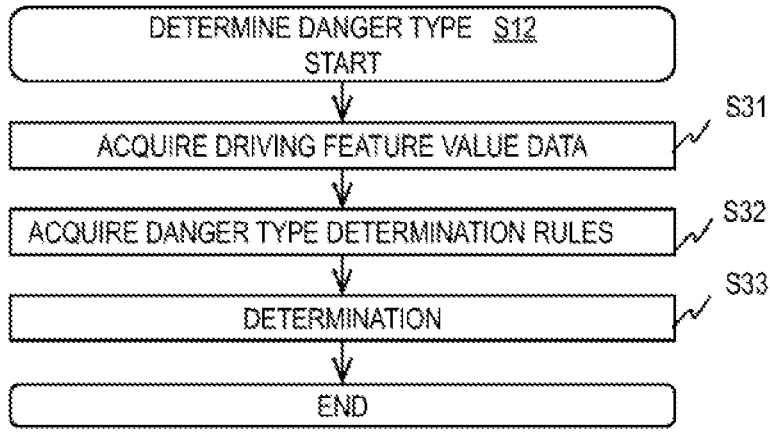
FIG. 14 is a flowchart showing details of danger type determination.

Next, the danger type determination S12 will be described. FIG. 14 is a flowchart showing details of the danger type determination S12. First, the danger type determination unit 52 acquires the driving feature value data 12 (FIG. 3) (S31). Next, the danger type determination unit 52 acquires the danger type determination rules 13 (FIG. 4) (S33). The danger type determination unit 52 applies the danger type determination rules 13 to the driving feature value data 12 to set the determination results for each time period. The danger type determination results 14 (FIG. 5) are generated by outputting the data generated in this manner in tabular format.

Next, the feature value generation S13 based on match/mismatch in guidance types will be described. The guidance history feature value generation unit 53 uses the most recent guidance history (history of receiving guidance) of the driver to generate feature values based on the match/mismatch in the guidance types. As shown in FIG. 8, the guidance history 17 stores information including the driver, the guidance date, the danger type subject to guidance, and the guidance type corresponding to the danger type.

As described with reference to FIG. 9, the guidance history feature value generation unit 53 abstracts the guidance types to generate feature values based on the match/mismatch in the guidance types. As described above, the present embodiment determines the guidance content of the day according to the vehicle measurement data of the work day. Thus, the work day is the reference date. Guidance of that day has yet to be issued, and thus, no guidance history of the reference date exists.

As described with reference to FIG. 9, the guidance history feature value generation unit 53 calculates the combination of feature values respectively for all of the guidance type candidates. For example, if the guidance 1, the guidance 2, and the guidance 3 are all of the guidance types, then the guidance history feature value generation unit 53 generates a combination of the feature values for a case in which the guidance type on that day is the guidance 1, a combination of the feature values for a case in which the guidance type on that day is the guidance 2, and a combination of the feature values for a case in which the guidance type on that day is the guidance 3.

Figure 15:
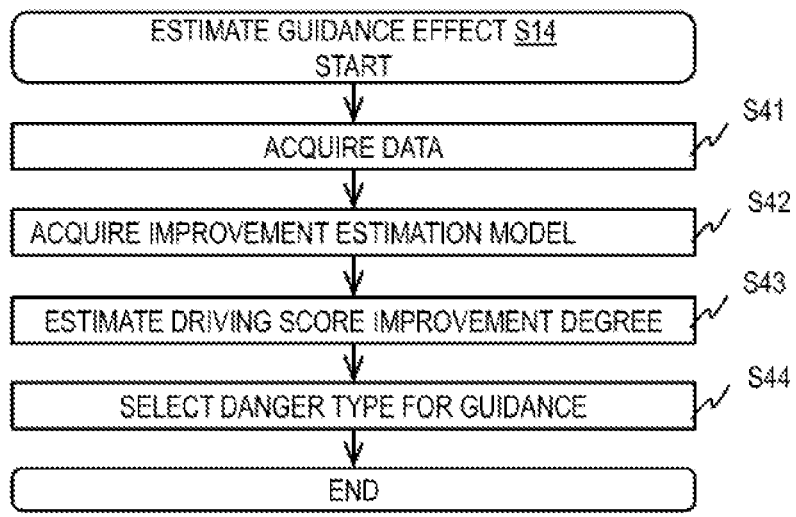
FIG. 15 is a flowchart showing details of guidance effect estimation.

Next, the guidance effect estimation S14 will be described. FIG. 15 is a flowchart showing details of the guidance effect estimation S14. The guidance effect estimation unit 54 acquires the danger type determination results 14 and the guidance history feature value data 18 (S41). The guidance effect estimation unit 54 acquires the improvement estimation model 55 (S42).

The guidance effect estimation unit 54 estimates the driving score improvement degree using the improvement estimation model 55 (S43). The guidance effect estimation unit 54 inputs, to the improvement estimation model 55, the combination of feature values of each record of the guidance history feature value data 18. The improvement estimation model 55 outputs the estimated value of the driving score improvement degree. As described above, there are combinations of guidance history feature values for each of the guidance type candidates. The guidance effect estimation unit 54 generates a driving score improvement degree estimated value for each of the guidance type candidates.

Next, the guidance effect estimation unit 54 selects the danger type subject to guidance on the basis of the estimated value of the driving score improvement degree (S44). The guidance effect estimation unit 54 selects the guidance type to be issued from among guidance type candidates on the basis of the estimated value of the driving score improvement degree, and identifies the danger type corresponding to the selected guidance type with reference to the guidance master 15. By referring to the driving score improvement degree, it is possible to select an effective guidance type that is expected to result in improved driving.

The guidance effect estimation unit 54 selects the danger type corresponding to the guidance type candidate for which the estimated value of the driving score improvement degree indicates the greatest improvement, for example. A condition differing from the driving score improvement degree may additionally be referred to for selecting the danger type. If multiple danger types exist for the same driving score improvement degree, then the guidance effect estimation unit 54 may select the danger type with the greatest number of occurrences in the danger type determination results 14, for example.

The for-guidance danger type data 16 (FIG. 7) is generated by outputting the data generated in this manner in tabular format. FIG. 7 shows an example in which one guidance type (danger type) is selected for each round of guidance. The guidance effect estimation unit 54 refers to the guidance content corresponding to the danger type subject to guidance from the guidance master 15 (FIG. 6) and stores the guidance content in the guidance content column 283. If there is time for guidance to be issued for multiple danger types upon the return of the driver, then multiple danger types may be selected.

Next, the video extraction and screen output S15 will be described. The video extraction screen output unit 56 selects a time period corresponding to the selected danger type of the driver in the danger type determination results 14. If multiple time periods with the danger type exist, then the video extraction screen output unit 56 selects one time period according to preset rules. Any selection criteria such as selecting the most recent time period, which would be thought to be most likely to remain in the memory of the driver, can be used, for example.

The video extraction screen output unit 56 extracts, from the footage of the drive recorder, a scenario in the selected time period. The video extraction screen output unit 56 uses information of the danger type subject to guidance and footage from the driver recorder to generate and output a guidance screen.

Figure 16:
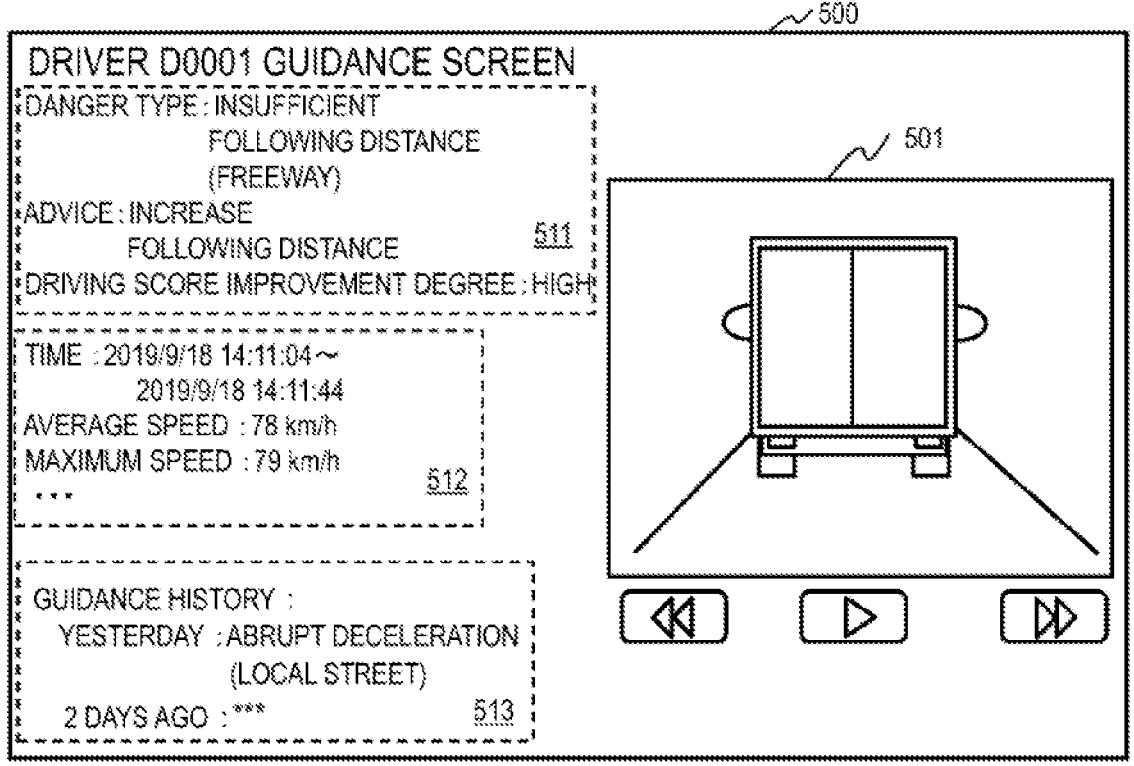
FIG. 16 shows an example of a guidance screen for one driver.

FIG. 16 shows an example of a guidance screen for one driver. The output device 124 displays a guidance screen 500, for example. The guidance screen 500 includes footage 501 of dangerous driving, information 511 of the danger type subject to guidance, information 512 of the feature values in the time period of the dangerous driving, and information 513 of the guidance history. By providing information accompanying the footage 501 of the dangerous driving, it is possible to issue more effective guidance to the driver. Some or all of the information 511, 512, and 513 may be omitted.

Figure 17:
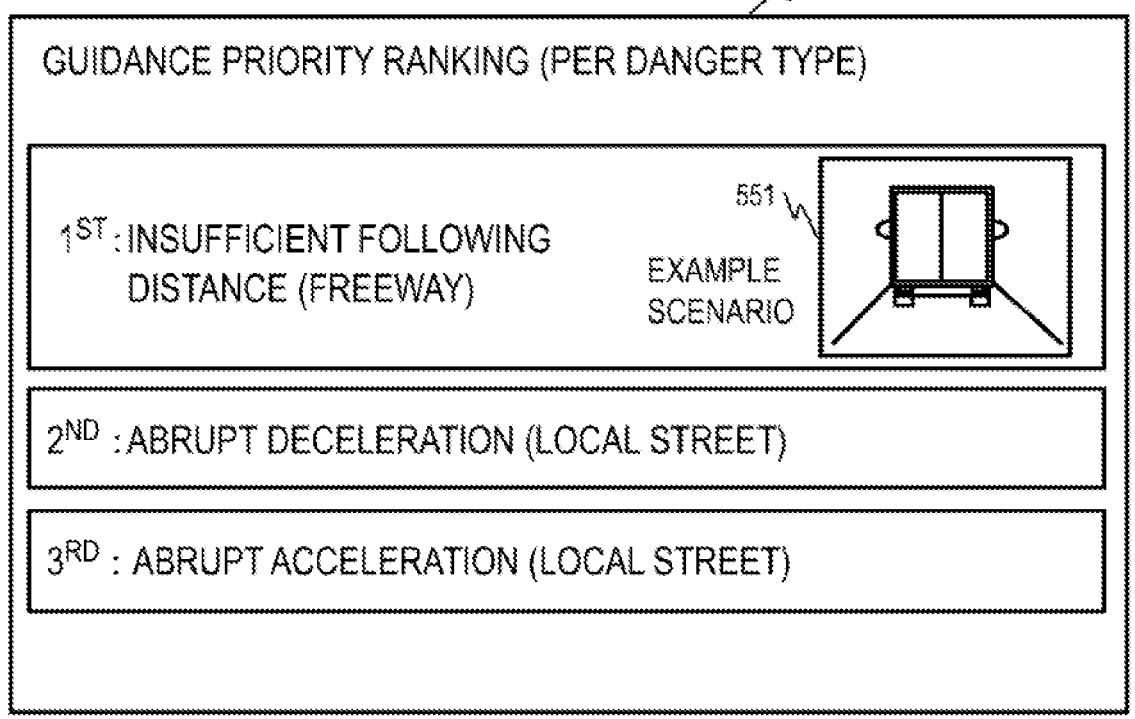
FIG. 17 shows an example of a guidance screen for multiple drivers.

FIG. 17 shows an example of a guidance screen for multiple drivers. The output device 124 displays a guidance screen 550, for example. The guidance screen 550 shows danger types that are listed in order of rank and footage 551 of an example scenario of each of the danger types. For example, the prescribed number of danger types are selected and displayed in order of highest driving score improvement degree. Through the guidance screen 550, it is possible to suitably guide multiple drivers simultaneously.

Figure 18:
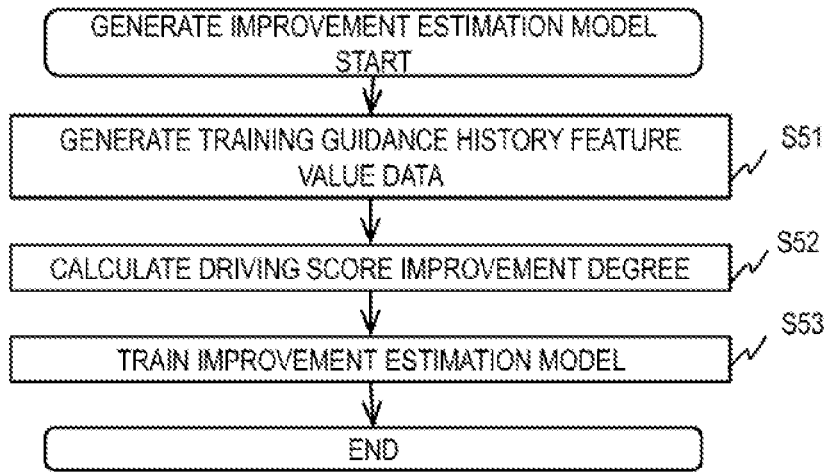
FIG. 18 shows a flowchart for generating an improvement estimation model.

Next, a method for generating (training) the improvement estimation model 55 will be described. FIG. 18 shows a flowchart for generating the improvement estimation model 55. The improvement estimation model 55 is generated through training by past history. The process of FIG. 18 is executed approximately once every few months, for example.

First, the guidance history feature value generation unit 53 generates the training guidance history feature value data 21 (FIG. 11) according to the guidance history 17 (S51). The guidance history feature value generation unit 53 selects the prescribed number (e.g., all) of reference dates from among reference dates for which records of the training guidance history feature value data 21 can be generated in the guidance history of each driver of the guidance history 17. As described with reference to FIG. 11, data prior to the reference date is necessary to calculate the feature values. The guidance history feature value generation unit 53 generates a record of training guidance history feature value data 21 for each combination of driver and selected reference date.

Next, the driving score improvement degree calculation unit 57 calculates the driving score improvement degree corresponding to each record of the training guidance history feature value data 21 to generate the driving score improvement degree data 20 (S52). The driving score improvement degree calculation unit 57 uses the danger type determination result history 19. The danger type determination result history 19 has a similar table structure to the danger type determination results 14 (FIG. 5) and is an accumulated history of past danger type determination results 14.

Specifically, the driving score improvement degree calculation unit 57 calculates the driving score of each work day of each driver from the danger type determination result history 19 as described with reference to FIG. 10. The driving score improvement degree calculation unit 57 calculates the driving score improvement degree resulting from guidance on the reference date indicated by the training guidance history feature value data 21 according to the calculated driving score as described with reference to FIG. 10. As described above, the past and future driving scores from the perspective of the reference date are necessary in order to calculate the driving score improvement degree resulting from guidance on the reference date. In the training guidance history feature value data 21, records for which the driving score improvement degree cannot be calculated are deleted.

Next, an improvement estimation model training unit (not shown) performs training (learning) of the improvement estimation model 55 to generate the improvement estimation model 55 (S53). The improvement estimation model training unit performs supervised learning using the training guidance history feature value data 21 and the driving score improvement degree data 20 as training data. The combination of feature values of one reference date (record) indicated by the training guidance history feature value data 21 is the predictor variable (input) and the driving score improvement degree of the reference date is the response variable (output). The driving score improvement degree data 20 indicates a desired value (training data) for the driving score improvement degree. By the above process, the trained improvement estimation model 55 is generated.

Figure 19:
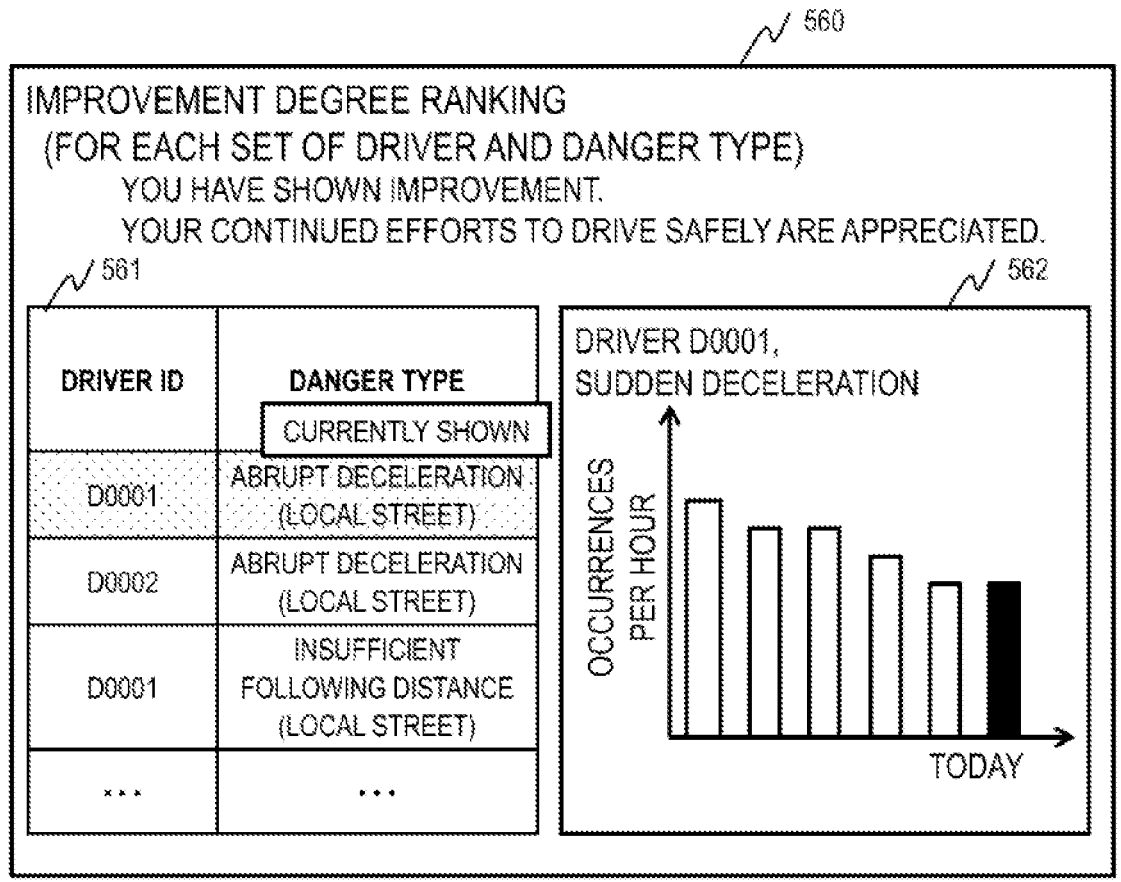
FIG. 19 shows an example of a screen for evaluating compliance to guidance.

Next, another example of the guidance screen will be described. The guidance screen shown in FIG. 16 or 17 points out instances of dangerous driving detected from the driving history. In another example, the guidance information provision system 1 may display a guidance screen that recognizes a driver who has demonstrated improved driving. FIG. 19 shows an example of a screen 560 for evaluating compliance to guidance. The guidance information provision system 1 refers to the danger type determination result history 19, for example, and evaluates the progression in occurrence frequency for each danger type by each driver. If it is found that the occurrence frequency is decreasing, the guidance information provision system 1 displays information to that effect in the evaluation screen 560.

The guidance screen 560 includes a list 561 of danger types for which a decrease in occurrence frequency has been found in the driving performed by the driver, and detailed information 562 of an entry selected from the list 561. The list 561 is a combination of drivers and danger types. The detailed information 562 indicates the change in frequency of the selected danger type. In the example of FIG. 19, the detailed information 562 is a bar graph of frequencies of a selected danger type for each day.

Embodiment 2

In Embodiment 1, guidance is issued using a guidance screen to a driver who has returned, on the basis of vehicle measurement data generated during driving throughout the day. In Embodiment 2 described below, processes for extracting dangerous scenarios, for which guidance should be provided, from the vehicle measurement data taken during activities are sequentially performed, and guidance is issued during work hours if spare time is found. Differences from Embodiment 1 will be primarily described below.

Figure 20:
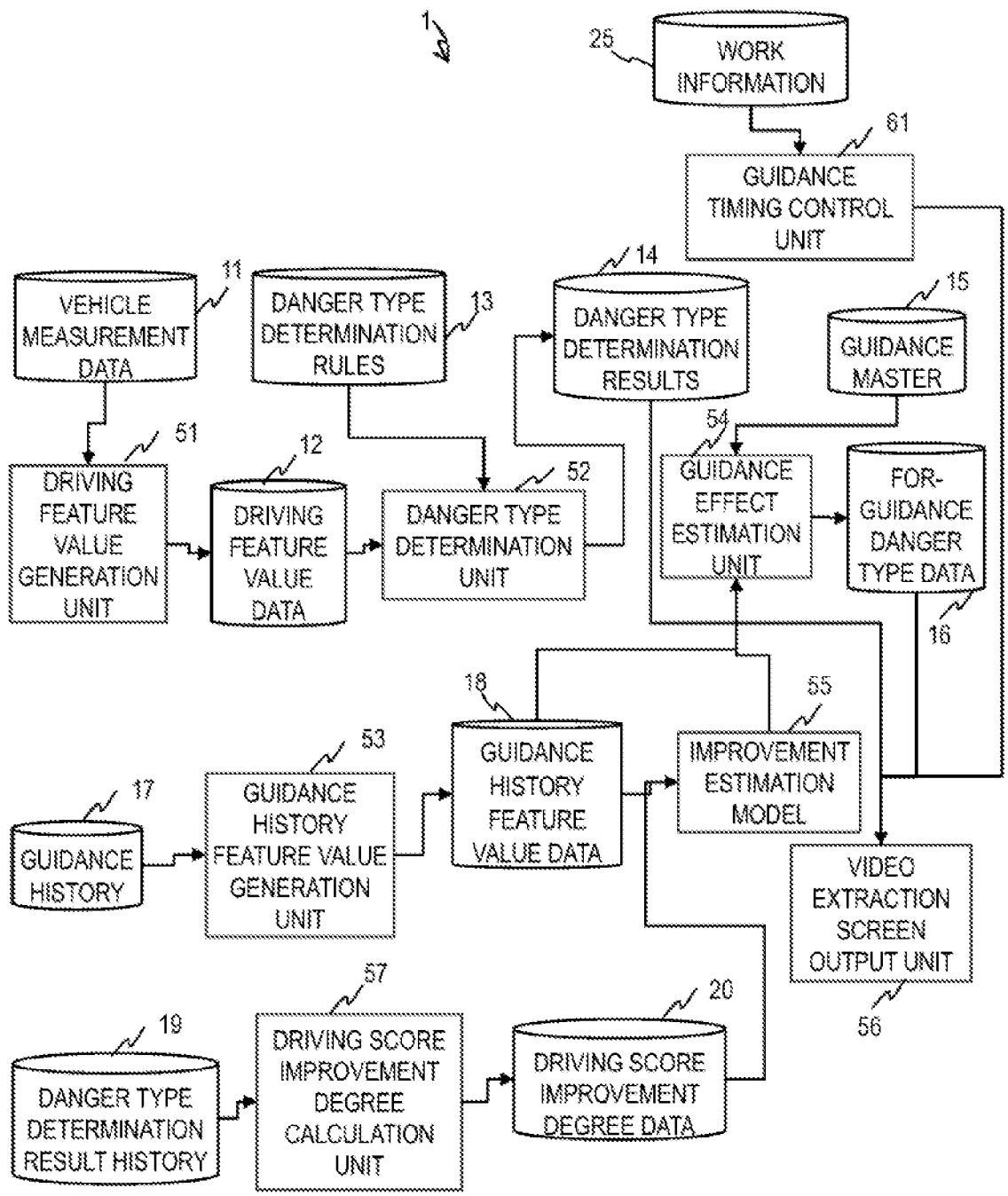
FIG. 20 shows a logic configuration example of a guidance information provision system according to Embodiment 2.

FIG. 20 shows a logic configuration example of a guidance information provision system 1. The guidance information provision system 1 includes work information 25 and a guidance timing control unit 61 in addition to the configuration shown in FIG. 1A. FIGS. 21 and 22 show information included in the work information 25. Specifically, FIG. 21 shows a work plan 31 and FIG. 22 shows work progress 32.

The work plan 31 includes a driver ID column 381, a start date/time column 382, an end date/time column 383, and a task column 384. The driver ID column 381 indicates the ID of the driver. The start date/time column 382 and the end date/time column 383 indicate the start date/time and end date/time for each task planned for the driver indicated in the driver ID column 381. The task column 384 indicates the planned tasks.

The work progress 32 indicates the actual progress of the driver acquired from a vehicle-installed sensor or a vehicle-installed work management system. In the example of FIG. 22, the work progress 32 has a driver ID column 401, a date/time column 402, and a state column 403. The driver ID column 401 indicates the ID of the driver. The date/time column 402 indicates the date and time. The state column 403 indicates the actual state of the driver indicated by the driver ID column 401 at each date and time indicated by the date/time column 402.

The guidance timing control unit 61 performs guidance timing control based on the work state of the driver. The guidance timing control unit 61 determines whether the driver is currently able to receive guidance on the basis of the work plan 31 and the work progress 32. For example, the guidance timing control unit 61 compares the work plan 31 to the work progress 32 and detects a state in which work has been completed ahead of schedule and the driver is not currently driving.

Upon determining that there is spare time to issue guidance to the driver, the guidance timing control unit 61 issues a notification to a smart device carried by the driver, for example, and displays the guidance screen 500 such as that shown in FIG. 16. The guidance screen 500 is generated on the basis of vehicle measurement data taken during driving conducted up to the current guidance from guidance previous to the present day or from the start of work on the current day if the guidance is the first guidance issued that day.

If a conversation with a safety manager who is present at an office and handles safety is necessary, then the guidance timing control unit 61 may issue a notification to the safety manager. If the safety manager deems it necessary to issue guidance to the driver, the safety manager contacts the driver. At this time, the safety manager issues a notification to the driver including the URL of the guidance screen 500 of FIG. 16. The driver receives safety guidance from the safety manager while sharing the guidance screen 500 with the safety manager.

The information included in the screen described in the present embodiment constitutes merely one example; the embodiment is not necessarily limited to including all configurations described, and some configurations may be eliminated or replaced, or other configurations may be added. For example, information that could be set by a specialist may be added, even regarding configurations not described in the present embodiment.

The present invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A system for generating guidance information for a driver, the system comprising:
   one or more processors; and
   one or more storage devices that store a command code to be executed by the one or more processors,
   wherein the one or more storage devices store guidance history of the driver, and
   wherein the one or more processors
   generate a feature value based on match/mismatch of guidance types abstracted from the guidance history,
   determine a guidance type for the driver on the basis of the feature value, and
   generate information for issuing guidance of the determined guidance type to the driver according to driver monitoring information,
   wherein the one or more processors generate the feature value from guidance history of the prescribed number of days prior to a reference date, the reference date being a day on which guidance of the determined guidance type is issued to the driver, and
   wherein the feature value includes at least one of the number of instances of guidance, the number of guidance types, the number of instances of guidance types having the most consecutive instances, and the number of instances of guidance of a same type as the guidance type on the reference date, within the prescribed number of days prior to the reference date.

2. The system according to claim 1,
   wherein the one or more processors
   estimate a driving improvement degree of the driver resulting from guidance of multiple guidance type candidates on the basis of the feature value, and
   select the guidance type from the multiple guidance type candidates on the basis of the driving improvement degree.

3. The system according to claim 1,
   wherein the feature value includes a feature value indicating a pattern of match/mismatch of the guidance type.

4. The system according to claim 1,
   wherein the one or more processors
   divide vehicle measurement data included in the drive monitoring information into multiple time periods on the basis of a rule set in advance,
   determine the danger type for driving in each of the time periods, and
   generate information for issuing guidance of the determined guidance type to the driver according to information of the time period of the danger type corresponding to the guidance type.

5. The system according to claim 1,
   wherein the one or more storage devices store a work plan and work progress of the driver, and
   wherein the one or more processors determine a time to present to the driver guidance of the determined guidance type while the driver is conducting activities, on the basis of the work plan and the work progress.

6. A method for generating guidance information for a driver by a system, the method comprising:
   providing one or more processors;
   providing one or more storage devices that store a command code to be executed by the one or more processors, wherein the one or more storage devices store guidance history of the driver;
   the system generating a feature value based on match/mismatch of guidance types abstracted from the guidance history of the driver;
   the system determining a guidance type for the driver on the basis of the feature value; and
   the system generating information for issuing guidance of the determined guidance type to the driver according to driver monitoring information,
   wherein the one or more processors generate the feature value from guidance history of the prescribed number of days prior to a reference date, the reference date being a day on which guidance of the determined guidance type is issued to the driver, and
   wherein the feature value includes at least one of the number of instances of guidance, the number of guidance types, the number of instances of guidance types having the most consecutive instances, and the number of instances of guidance of a same type as the guidance type on the reference date, within the prescribed number of days prior to the reference date.

* * * * *